United States Patent
Rinfret et al.

(10) Patent No.: US 10,255,083 B2
(45) Date of Patent: Apr. 9, 2019

(54) METHOD AND SYSTEM FOR UNIFIED INPUT IN CROSS-PLATFORM STREAMING APPLICATIONS IN CLOUD COMPUTING ENVIRONMENTS

(71) Applicant: Ubisoft Entertainment, Rennes (FR)

(72) Inventors: Simon Rinfret, Québec (CA);
Oleksandr Khilko, Québec (CA);
Alexandre Larouche, Québec (CA)

(73) Assignee: Ubisoft Entertainment, Rennes (FR)

( * ) Notice: Subject to any disclaimer, the term of this patent is extended or adjusted under 35 U.S.C. 154(b) by 0 days.

(21) Appl. No.: 14/484,957

(22) Filed: Sep. 12, 2014

(65) Prior Publication Data
US 2016/0077603 A1    Mar. 17, 2016

(51) Int. Cl.
*G06F 3/03* (2006.01)
*G06F 9/451* (2018.01)

(52) U.S. Cl.
CPC .................................. *G06F 9/452* (2018.02)

(58) Field of Classification Search
CPC .......... G06F 3/017; G06F 3/011; G06F 3/013; G06F 3/005; G06F 3/016
See application file for complete search history.

(56) References Cited

U.S. PATENT DOCUMENTS

| | | | | |
|---|---|---|---|---|
| 6,166,746 A | * | 12/2000 | Inada | G06T 13/40 345/473 |
| 2008/0227548 A1 | * | 9/2008 | Choudhry | A63F 13/12 463/42 |
| 2008/0309816 A1 | * | 12/2008 | Quan | H04N 5/913 348/441 |
| 2010/0022302 A1 | * | 1/2010 | Iwakiri | A63F 13/12 463/30 |
| 2012/0102485 A1 | * | 4/2012 | Goldman | G06F 8/64 717/176 |
| 2012/0143358 A1 | * | 6/2012 | Adams | A63F 13/10 700/92 |
| 2013/0162519 A1 | * | 6/2013 | Ameling | G06F 3/0488 345/156 |
| 2014/0234814 A1 | * | 8/2014 | Krosky | G09B 5/02 434/236 |

* cited by examiner

Primary Examiner — Olga V Merkoulova
(74) Attorney, Agent, or Firm — Erise IP, P.A.

(57) ABSTRACT

A computer program, method, and system for cross-platform input data unification. According to some embodiments, a first input data is received from a first input device connected to a first platform. The input data is converted to a standard action. The standard action is transmitted to a second platform capable of determining a relationship between the standard action and a second input device associated with the second platform. The second platform can use the input data to trigger an action associated with the standard action in the application or gaming environment.

20 Claims, 4 Drawing Sheets

METHOD AND SYSTEM FOR UNIFIED INPUT IN CROSS-PLATFORM STREAMING APPLICATIONS IN CLOUD COMPUTING ENVIRONMENTS

BACKGROUND

Embodiments of the invention relate to systems and methods for providing uniform input from arbitrary input devices in cross-platform streaming applications. Such applications could be streamed over the Internet or hosted in a cloud-computing environment. In a cross-platform environment, different platforms may use different types of input devices to perform similar actions. For example, one platform may use a gamepad and another platform may use a standard two-button mouse. For a given application on the first platform, pressing button one on the gamepad may cause a particular action (e.g., jump) while that same action on the second platform may be caused by a click of the left mouse button.

As increasingly diverse platforms with their associated input devices become connected via the Internet or over a cloud-computing environment, the set of possible input device signals that could cause the same action in a particular application or video game explodes. Embodiments of the invention relate to facilitating a uniform input method allowing signals from any input device on any platform to be correctly translated into an action in an application or video game.

SUMMARY

Embodiments of the invention provide a system and method for providing unified input from various input devices in a cross-platform environment for use in applications and games utilized over a network or cloud computing system.

Embodiments of the invention provide a non-transitory computer readable storage medium with an executable program stored thereon for cross-platform input data unification. According to some embodiments, a first input data is received from a first input device connected to a first platform. The input data is converted to a standard action. The standard action is transmitted to a second platform capable of determining a relationship between the standard action and a second input device associated with the second platform. The second platform can use the input data to trigger an action associated with the standard action in the application or gaming environment.

Embodiments of the invention also provide a non-transitory computer readable storage medium with an executable program stored thereon for cross-platform input data unification. According to some embodiments, a standard action is received from a first platform. The standard action is related to input data from a first input device related to the first platform. The standard action is converted to a second input data related to an input device associated with a second platform. The second platform can use the input data to trigger an action associated with the standard action in the application or gaming environment.

Embodiments of the invention also provide a system for cross-platform input data unification. According to some embodiments, the system includes a first platform configured to receive input data from a first input device. The first platform is further configured to convert the input data to a standard action. The first platform is additionally configured to transmit the standard action to a second platform. The transmission could occur via any network connection, including the Internet and/or the cloud. The system includes a second platform configured to receive the standard action and convert it to input data related to a second input device associated with the second platform. The second platform is further configured to trigger an action related to the standard action in an application or gaming environment.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

DETAILED DESCRIPTION

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
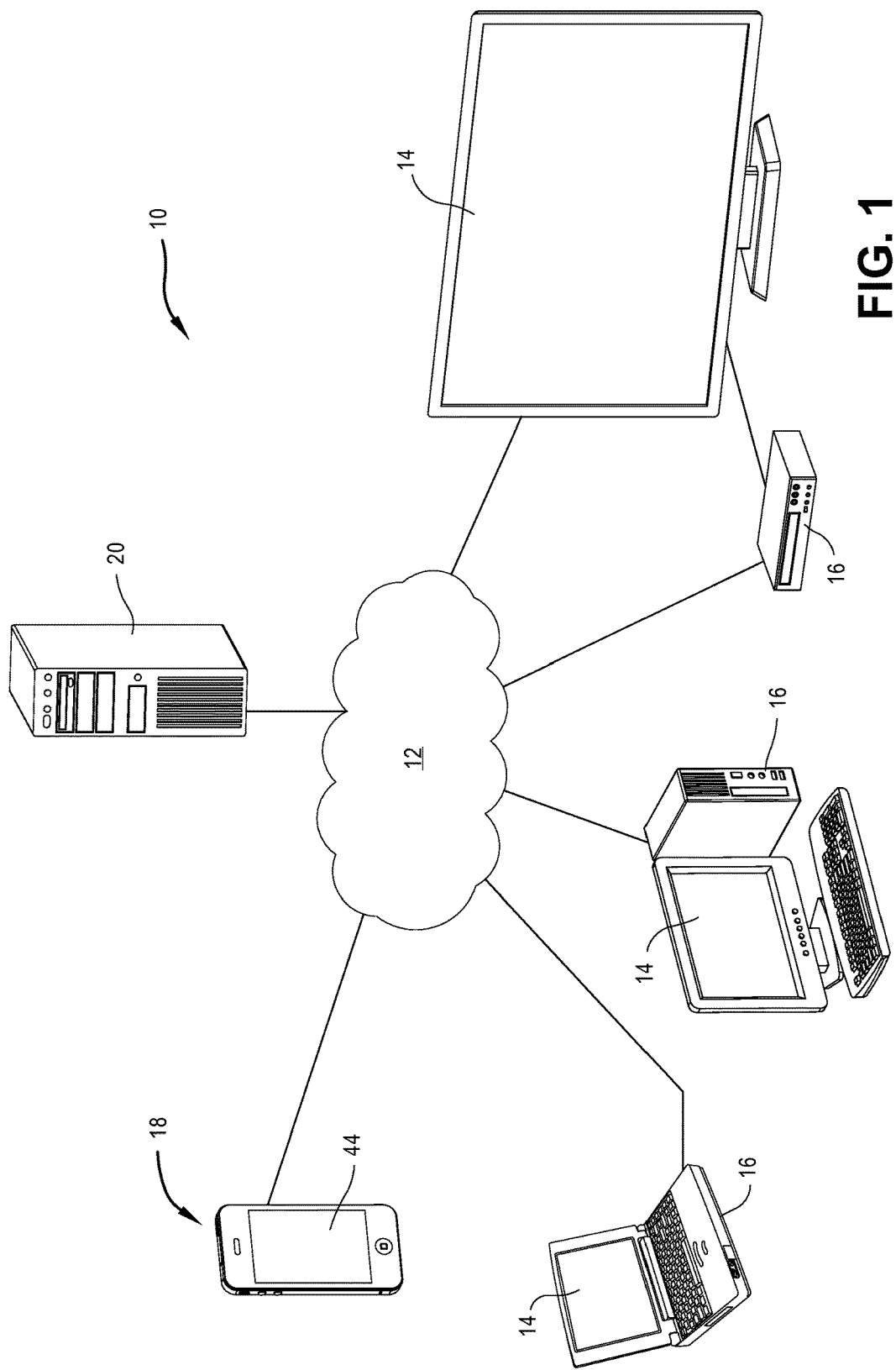
FIG. 1 is a schematic block diagram of a system of connected platforms, constructed in accordance with various embodiments of the invention.

A system 10 that may be used for facilitating the use of input data across different computing and gaming platforms, constructed in accordance with various embodiments of the invention, is shown in FIG. 1. Such platforms could be used for playing electronic or computer-based games on a communication network 12. The electronic games, hereinafter "game" or "games," typically include interactive video games in which the player responds to images on a display 14. The player may engage in actions or motions when prompted by proceedings shown on the display 14. For example, the player may dance by mimicking or following the motions of a dance leader shown on the display 14. Or, the player may simulate participating in a sport, such as throwing a baseball, hitting a tennis ball, or dribbling a basketball. In addition, the player may engage in simulated combat activity such as boxing. Alternatively, the player may respond to proceedings on the display 14 by singing. Finally, the player may use various input devices to cause an on-display character or avatar to perform various actions, including but not limited to, running, jumping, shooting and the like. Thus, the games may include dancing games, sporting games, combat games, role-playing games, adventure games, and so on.

The system 10 may broadly comprise a client device 16 constituting a computational or gaming platform, a personal input device 18, a server 20, By way of example to demonstrate the features of embodiments of the invention, but not intended to be limiting, an electronic game can be utilized by various users using different platforms. Furthermore, embodiments of the invention may be implemented in hardware, software, firmware, or combinations thereof.

The communication network 12 generally allows communication between the personal inputs 18 and the server 20 as well as the server 20 and the client devices 16 and between multiple client devices 16. The communication network 12 may include local area networks, metro area networks, wide area networks, cloud networks, the Internet, intranets, and the like, or combinations thereof. The communication network 12 may also include or connect to voice and data communication systems such as cellular networks, for example as 2G, 3G, or 4G, and public ordinary telephone systems. The communication network 12 may be wired, wireless, or combinations thereof and may include components such as switches, routers, hubs, access points, and the like. Furthermore, the communication network 12 may include components or devices that are capable of transmitting and receiving radio frequency (RF) communication using wireless standards such as Wi-Fi, WiMAX, or other Institute of Electrical and Electronic Engineers (IEEE) 802.11 and 802.16 protocols.

The displays 14 and 44, as in FIG. 1, generally show or display the actions and proceedings of the application or game along with scores or information or data related thereto. The displays 14 and 44 may include video devices of the following types: plasma, light-emitting diode (LED), organic LED (OLEO), Light Emitting Polymer (LEP) or Polymer LED (PLED), liquid crystal display (LCD), thin film transistor (TFT) LCD, LED side-lit or back-lit LCD, heads-up displays (HUDs), projection, combinations thereof, or the like. The displays 14 and 44 may possess a square or a rectangular aspect ratio and maybe viewed in either a landscape or a portrait mode. Examples of the displays 14 and 44 include monitors or screens associated with tablets or notebook computers, laptop computers, desktop computers, as well as televisions, smart televisions, wall projectors, theater projectors, or similar video displays.

The client device 16 generally receives aspects of the application or game from the server 20 or from other client devices and communicates the video content of the application or game to the display 14. In various embodiments, the client device 16 may include or have access to an audio system that receives the audio content of the application or game. The client device 16 may be capable of running or executing web browsers, web viewers, or Internet browsers, which may be used to access the server applications. Each client device may be a separate type of computing platform. Examples of the computing platforms (or just platforms) include but are not limited to tablet computers, notebook computers, laptop computers, and desktop computers, as well as video devices such as Blu-Ray players or other video streaming devices that are capable of running web browsers or video-based applications. In further embodiments, the client device 16 may be a stand-alone gaming console (e.g., PS3, PS4, Xbox One, etc.). In various embodiments, the client device 16 may be incorporated with, integrated with, or housed within the display 14.

The client device 16 may include a processing element, a clock, and a memory element. The processing element may include processors, microprocessors, microcontrollers, digital signal processors (DSPs), field-programmable gate arrays (FPGAs), analog and/or digital application-specific integrated circuits (ASICs), and the like, or combinations thereof. The processing element may generally execute, process, or run instructions, code, software, firmware, programs, applications, apps, processes, services, daemons, or the like, or may step through states of a finite-state machine.

Aspects of the invention are related to facilitating cross-platform use of device input information or signals. Attached to each computing platform can be a variety of input devices used by users or game players to interact with an application or game. Each type of platform may support different types of input devices. For example, a Personal Computer (PC) may support a mouse and keyboard while a gaming console may not provide support for a mouse and keyboard, but instead provide support for a gamepad or other gaming controller. Additionally, some input devices may support input via various gestures. For example, input devices could include cameras and touchscreens. Therefore, in order for input signals, commands or actions from the mouse and keyboard to be successfully used by the game console in the above example, some translations may occur.

Figure 2:
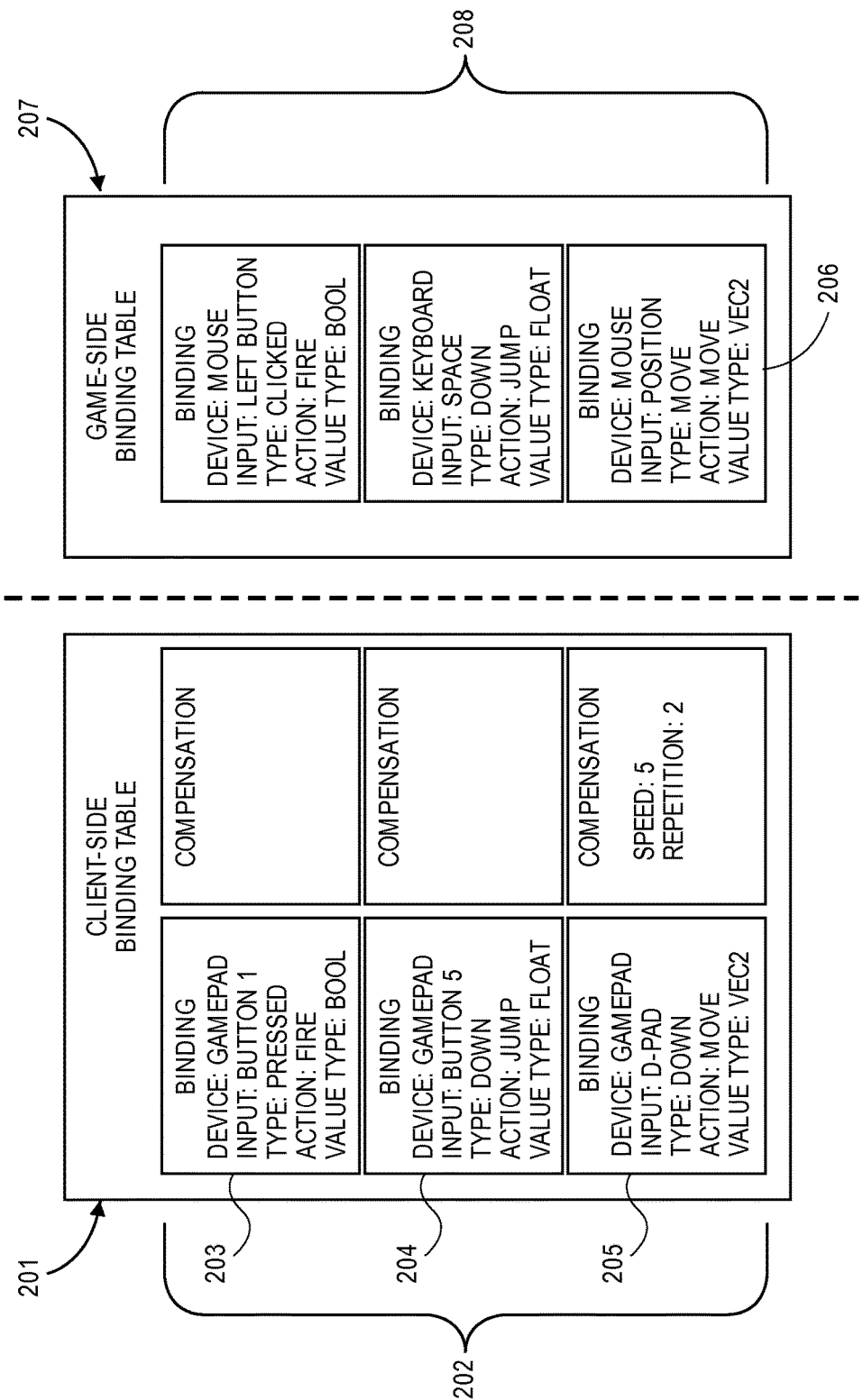
FIG. 2 is a schematic block diagram of various binding tables in accordance with various embodiments of the invention.

According to some embodiments of the invention, a mechanism is presented to facilitate the use of input devices across various platforms. For example, with reference to FIG. 2, two binding tables can be used to convert from one type of input device to another. For example, a client-side binding table 201 can be provided. The client-side binding table 201 could be used at a first platform with a first input device connected thereto. The client-side binding table 201 can have a number of table entries 202 to support various types of input devices connectable to the first platform as well as various input signals from those input devices. By way of example, table 201 shows three bindings 203, 204, 205 for various input signals related to a gamepad-type input device connected to a first computing platform.

Each entry in the client-side binding table 201 can have a variety of information. For example and without limitation, the binding table entries could include information related to a type of input device (e.g., gamepad, mouse, keyboard), the specific input signal (e.g., button 1, button 5, d-pad, space bar, left mouse button), and the type of action taken on the input signal (e.g., press, press and hold, down, click, position).

Additionally, each entry in the client-side binding table 201 can have information related to a type of action to take in the application or game related to the input from the input device related to the first platform. For example, actions could include firing, jumping, or moving an avatar. Some input signals and actions can be represented by Boolean values. For example, it could be that a particular button press causes a character to fire a weapon. However, other actions might require more information. For example, a game could increase the rate of an avatar's movement depending on how far a particular analog stick control is moved. In such cases extra information in addition to the fact that the stick has been moved could be used to facilitate the movement. Such information could be in the form of non-Boolean values. For example but without limitation, non-Boolean values could be represented by floating point numbers, integers, vectors of integers, and/or vectors of floating point numbers.

Each entry in the client-side binding table 201 can also be related to a compensation entry. Certain actions may have absolute values for a particular input device. For example, a scroll wheel on a mouse might turn a certain number of degrees at a certain rate. Such input information might translate to a particular avatar moving a certain amount faster than if the wheel was turned at a slower rate. This type of information could be capture in the compensation value. Compensation values might include more generic information such as speed of input movement and repetition. This type of compensation information could then be used by a different platform to modify the type of action suggested by the client-side binding table 201 and discussed above.

According to some embodiments of the invention, the client-side binding table 201 is used to convert input-device-specific input signals to standard actions that any platform could use to trigger particular actions in an application or game. Therefore, when a particular input is received by a first platform, the platform could use the client-side binding table 201 to translate the input into a standard action, potentially along with a value and/or compensation entry. This standard action could then be transmitted to a game-side platform, which could be a different platform than the first platform. Such transmission could occur using cloud-computing techniques, or over the Internet, or any of the other network mechanisms discussed above.

The second platform could contain a game-side binding table 207. The game-side binding table could include a number of entries 208, each including mappings from the various standard actions discussed above to specific types of input from input devices related to the second platform. For example, each entry in the game-side binding table 207 could include information related to the standard actions, values and compensation values as discussed above. Additionally, each entry in the game-side binding table 207 could include information related to the input device related to the second platform. This information could be similar to the sorts of information discussed previously, for example, including a device type (e.g., keyboard, mouse, gamepad), an input signal type (e.g., space bar, position), and a type of action (e.g., press, click).

Figure 3:
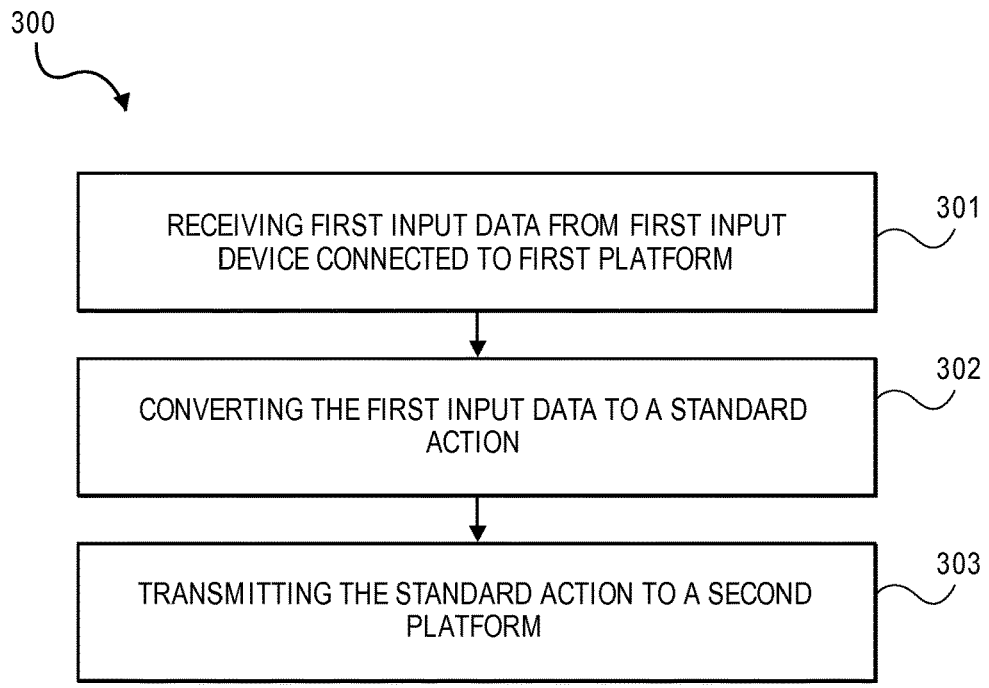
FIG. 3 is a flow chart depicting a method of providing a uniform input system in accordance with various embodiments of the invention.

With reference now to FIG. 3, a method 300 of providing unified input in a cross-platform environment is depicted in accordance with various embodiments of the invention. In step 301, a first input data is received from a first input device associated with a first platform. The first platform could be any type of computing platform capable of supporting applications or games. For example, the platform could be one of the types described above, including gaming consoles, personal computers, tablets, and smart phones. The first input device could be directly connected to the first platform, or it could be associated with the first platform, for example by the first platform having code to support the first input device. Input devices might include a number of device types as discussed above, including but not limited to a mouse, a keyboard, a gamepad, a joystick, and the like. The first input data could be any type of data commonly associated with input devices. For example, the input data could be an analog signal, a Boolean value, an integer value, or a floating-point value. The input data may also include information related to the particular action taken on the input device. For example, the input data may include information that indicates a particular button was pressed or moved (e.g., left-click or X-button). The input data may also include other information related to the action taken on the input device (e.g., moved up, held down, pressed and released). The input data may also include vector quantities and/or gesture information.

In step 302, the first input data is converted to a standard action. As described in detail with reference to FIG. 2, various binding tables could be used to facilitate the conversion of the first input data to a standard action. Standard actions can include actions related to particular games, such as fire, jump, run, etc. Standard actions may also include a set of generic actions such as up, down, click button 1, and the like. In this way, the standard actions could be mapped to any action in a specific application or game. Standard actions could also include values related to an amount or intensity as well as compensation values. Compensation values could be used to help translate from analog inputs to digital representation. For example, a particular analog value related to the movement of a mouse might be converted in part into a compensation value related to a movement or speed modifier, such as +3. Standard actions might also include various vectors to further describe the standard action. For example, a vector of three integers could represent a standard movement action in three dimensions.

In step 303, the standard action is transmitted to a second platform. The second platform may be of a different type than the first platform, or it may be of the same type. For example, if the first platform was a personal computer, the second platform could be a game console. As another example, if the first platform was a PS4 game console, the second platform could be a PS3 game console. The second platform can have a second input device associated with it, where such association can include software supporting a second type of device. Such association could also include having a second input device connected, either wirelessly, wired, or through some other network connection, to the second platform. The second computing device could convert the standard action to input data related to the second computing device.

Figure 4:
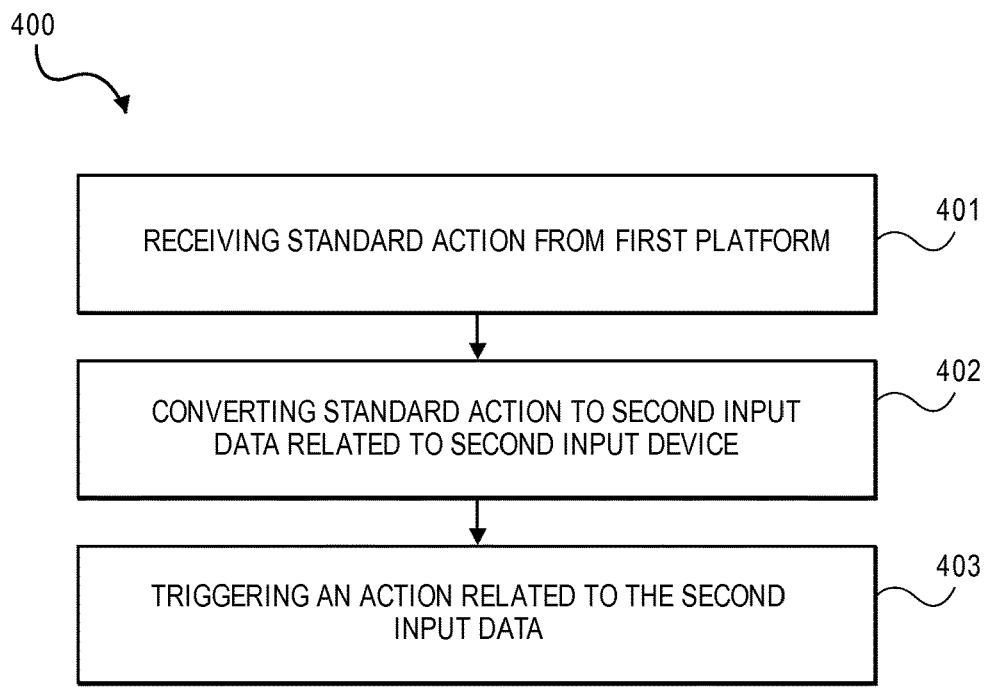
FIG. 4 is a flow chart depicting a method of providing a uniform input system in accordance with various embodiments of the invention.

Now with reference to FIG. 4, a method 400 of providing unified input in a cross-platform environment is depicted in accordance with various embodiments of the invention. In step 401, a standard action is received from a first platform. The standard action could be received at an intermediate server or computing device or at a second platform. As described above, standard actions can include actions related to particular games, such as fire, jump, run, etc. Standard actions may also include a set of generic actions such as up, down, click button 1, and the like. Standard actions could also include values related to an amount or intensity as well as compensation values. Compensation values could be used to help translate from analog inputs to digital representation. Standard actions might also include various vectors to further describe the standard action.

In step 402, the standard action is converted to input data related to a second input device. The second input device can be associated with a second platform, for example through software support such as a driver, or via physical or network connection to the second platform. The conversion could be accomplished through the use of one or more binding tables. For example, a game-side binding table such as that described with respect to FIG. 2 could be used to convert the standard action to input data.

In step 403, the second platform triggers an action in an application or game that is related to the second input data. For example, the second input data could be used as native input to the application or game running on the second platform, as if it had originated from a second input device connected to or supported by the second platform.

Figure 5:
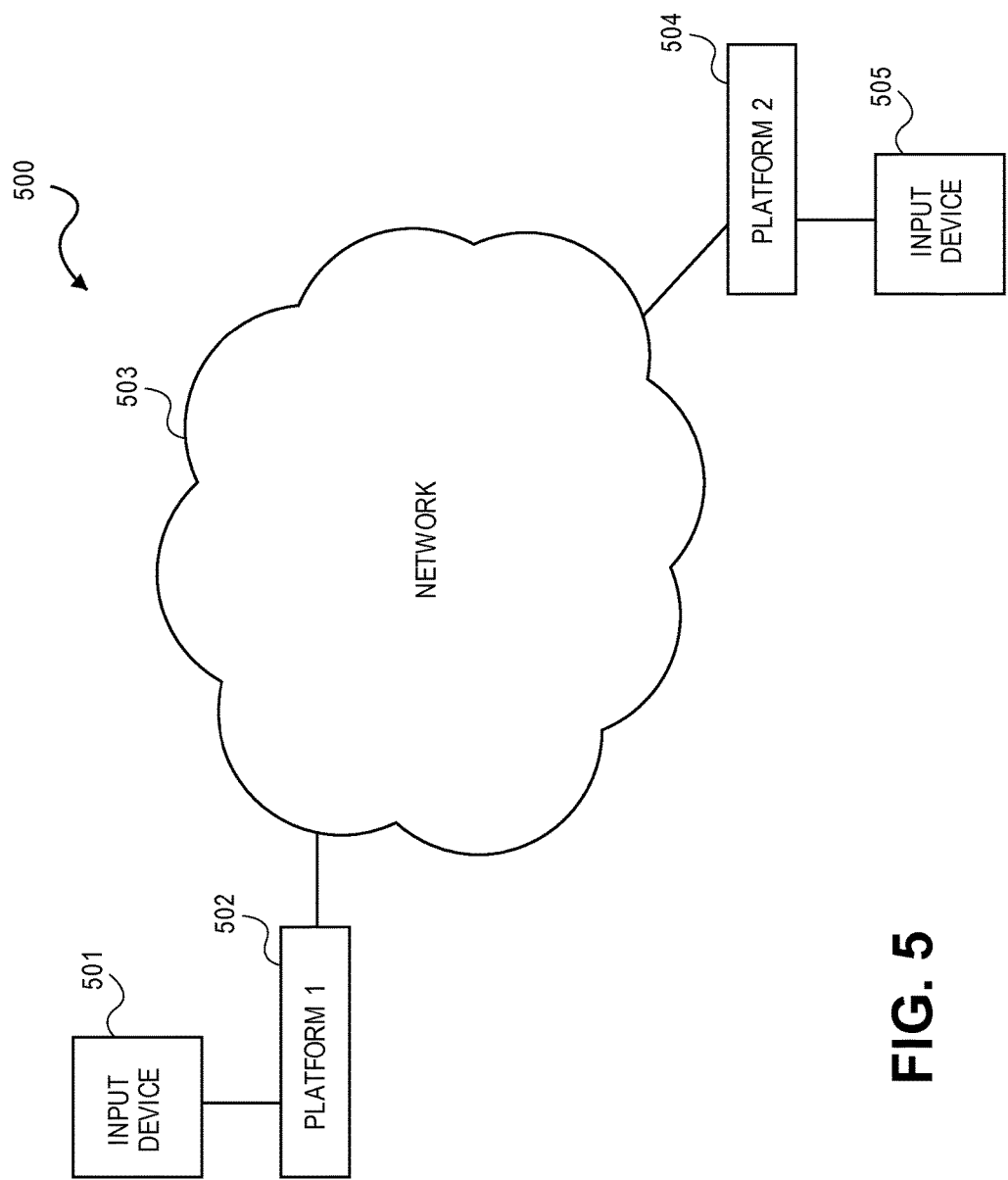
FIG. 5 is a schematic block diagram of a system for providing a uniform input in a cross-platform environment in accordance with various embodiments of the invention.

With reference now to FIG. 5, a system 500 of providing unified input in a cross-platform environment is depicted in accordance with various embodiments of the invention. The system includes a first platform 502 with a first input device 501 associated with it. The first platform 502, according to various embodiments of the invention, includes software and/or hardware to receive input data from input device 501. Input device 501 could be connected to platform 502 in any way, including via a wired or wireless connection or via a network connection. Platform 502 is further configured to convert the input data from input device 501 to a standard action. The standard action can be as described above. For example, standard actions can include actions related to particular games, such as fire, jump, run, etc. Standard actions may also include a set of generic actions such as up, down, click button 1, and the like. Standard actions could also include values related to an amount or intensity as well as compensation values. Compensation values could be used to help translate from analog inputs to digital representation. Standard actions might also include various vectors to further describe the standard action. Platform 502 could use a binding table such as that described with reference to FIG. 2. The platform 502 is further configured to transmit the standard action to a second platform 504. Platform 502 is capable of communicating with the second platform 504 via some form of network 503. For example, platform 502 could be communicating with platform 504 via the Internet or via a cloud computing system. Platform 502 could be communicating with platform 504 through other types of network connections as well, such as a wireless connection or a direct connection.

A second platform 504 is configured to receive the standard action via the network 503. Platform 504 is further configured to convert the standard action to input data related to a second input device 505 related to platform 504. Platform 504 could use a binding table such as that described with reference to FIG. 2 to convert the standard action to input data. Input device 505 could be related to platform 504 through software or hardware support, such as through a device driver. Input device 505 could be related to platform 504 through a direct connection or a network connection. Additionally, input device 505 could be a virtual device. For example, in a cloud environment, software could be running on a server in a data center with no physical input devices connected thereto. Thus input device 505 could be a virtual device, with actions still being triggered as if they were triggered by a physical external input device. Platform 504 is further configured to trigger an action related to the input data. The action could be an action in an application or game executing on platform 504. The system 500 can allow a user of platform 502 to interact with an application or game executing on platform 504 through the use of input device 501, even if input device 501 is not supported on platform 504, for example, because platform 504 is of a different type than platform 501.

Having thus described various embodiments of the invention, what is claimed as new and desired to be protected by Letters Patent includes the following:

1. A non-transitory computer readable storage medium with an executable program stored thereon for cross-platform input data unification, wherein the program instructs a processing element to perform the following steps:
   receiving, from a user and via a first type of gaming input device connected to a first gaming platform, a first gaming command,
   wherein the first gaming command is specific to the first type of gaming input device,
   wherein the first type of gaming input device is distinct from a second type of gaming input device,
   wherein the first gaming platform is a first type of gaming platform distinct from a second type of gaming platform;
   converting, by the first gaming platform, the first gaming command specific to the first type of input device to a cross-platform standard gaming input action;
   transmitting the standard gaming input action to a second gaming platform of the second type of gaming platform;
   converting the standard gaming input action to a second gaming command specific to the second type of gaming input device connected to the second gaming platform; and
   triggering the second gaming command on the second gaming platform.

2. The medium of claim 1, wherein the standard gaming input action comprises an action and a value.

3. The medium of claim 1, wherein the first gaming command comprises a Boolean value.

4. The medium of claim 1, wherein the first gaming command comprises a non-Boolean value.

5. The medium of claim 3, wherein the transmitting further comprises transmitting a non-Boolean value quantifying the first gaming command related to the standard gaming input action.

6. The medium of claim 3 further comprising transmitting a compensation value related to the standard gaming input action.

7. The medium of claim 1, wherein the transmitting further comprises transmitting a vector quantity.

8. The medium of claim 6, wherein the vector quantity represents control in three dimensions.

9. The medium of claim 1, wherein the first gaming command comprises gesture input data.

10. The medium of claim 1, wherein the first gaming platform is a gaming console.

11. The medium of claim 1, wherein the second gaming platform is a gaming console.

12. A non-transitory computer readable storage medium with an executable program stored thereon for cross-platform input data unification, wherein the program instructs a processing element to perform the following steps:
   receiving a cross-platform standard gaming input action from a first gaming platform of a first type of gaming platform distinct from a second type of gaming platform,
   wherein the standard gaming input action was converted from a first gaming command received from a user and specific to a first type of gaming input device distinct from a second type of input device and connected to the first gaming platform, converting the standard gaming input action to a second gaming command specific to the second type of gaming input device connected to a second gaming platform of the second type of gaming platform, and triggering an action related to the second gaming command.

13. The medium of claim 12, wherein receiving further comprises receiving a non-Boolean value quantifying the first gaming command related to the standard gaming input action.

14. The medium of claim 13, wherein receiving further comprises receiving a compensation value related to the standard gaming input action.

15. The medium of claim 14, further comprising applying the compensation value to the non-Boolean value quantifying the first gaming command to produce an adjusted value.

16. The medium of claim 15, wherein the trigging an action is based on the adjusted value.

17. A system for cross-platform input data unification, the system comprising:

a first input device of a first type of input device distinct from a second type of input device;

a first gaming platform of a first type of gaming platform distinct from a second type of gaming platform configured to:

receive a first gaming command from the first input device connected to the first gaming platform, wherein the first gaming command is specific to the first type of gaming input device, convert the first gaming command to a cross-platform standard gaming input action, and transmit the standard gaming input action; and a second gaming platform configured to receive the standard gaming input action, convert the standard gaming input action to a second gaming command specific to a second gaming input device of the second type of gaming input device connected to the second gaming platform, and trigger an action corresponding to the second gaming command.

18. The system of claim 17, wherein the first gaming platform is connected to the second gaming platform via the Internet.

19. The system of claim 17 wherein the first platform is further configured to transmit a non-Boolean value quantifying the first gaming command related to the standard gaming input action.

20. The system of claim 19, wherein the first platform is further configured to transmit a compensation value related to the standard gaming input action.

* * * * *